(No Model.)
D. L. BARNES.
CAR BRAKE.
No. 438,673. Patented Oct. 21, 1890.
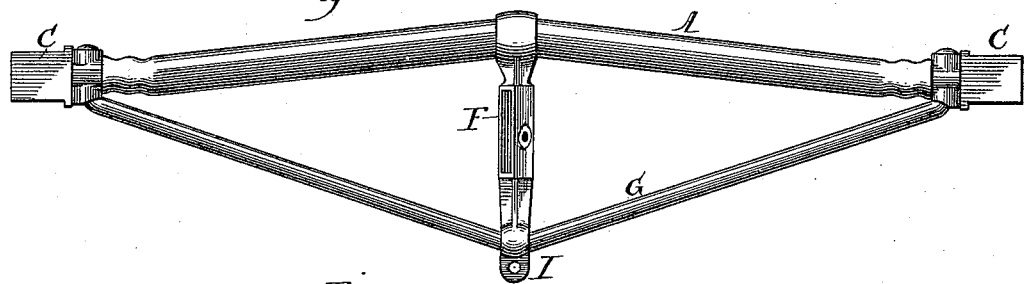
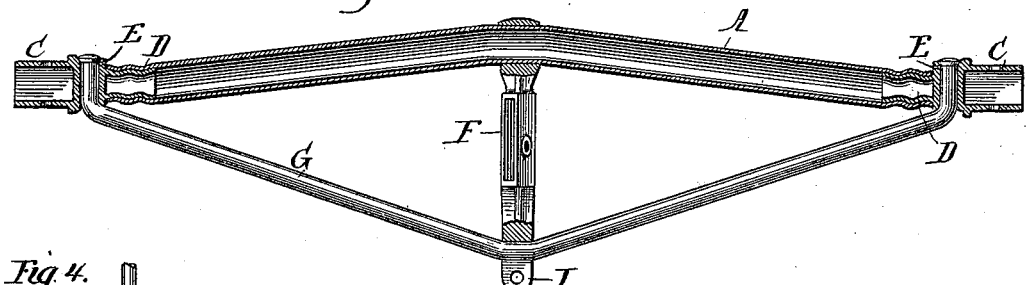
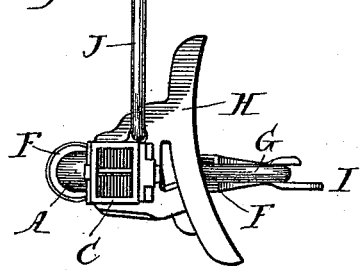
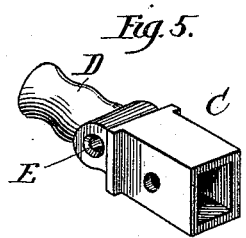
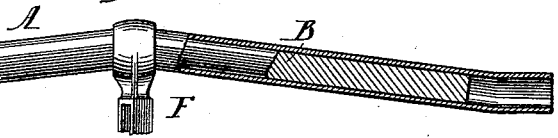
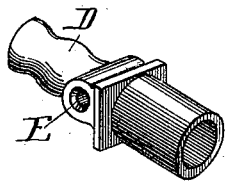
Witnesses:
Fred Gerlach
Charles Shevey.
Inventor:
David L. Barnes.
By Banning & Banning & Payson.
Attorneys.
THE NORRIS PETERS CO., PHOTO-LITHO., WASHINGTON, D. C.

UNITED STATES PATENT OFFICE.

DAVID L. BARNES, OF CHICAGO, ILLINOIS.

CAR-BRAKE.

SPECIFICATION forming part of Letters Patent No. 438,673, dated October 21, 1890.

Application filed July 18, 1890. Serial No. 359,120. (No model.)

*To all whom it may concern:*

Be it known that I, DAVID L. BARNES, a citizen of the United States, residing at Chicago, Illinois, have invented certain new and useful Improvements in Car-Brakes, of which the following is a specification.

The object of my invention has more special reference to the construction of the brake-beam and the attachment of the brake-head thereon; and my invention consists in the features and details of construction hereinafter described and claimed.

In the drawings, Figure 1 is a plan view of my improved brake-beam. Fig. 2 is a plan view of a horizontal section of the same. Fig. 3 is a plan view, partly in section, of the brake-beam before it is prepared for use. Fig. 4 is an end elevation of the brake-beam with the brake-shoe arranged thereon. Fig. 5 is a perspective view of one form of the brake-beam ends; and Fig. 6 is a perspective view of a modified form of such end, the same being hereinafter designated "socket-pieces."

In making my improvement in brake-beams I take a piece of pipe A, made of iron or steel of the proper length, and preferably about two inches and a half in external diameter. In order to give it increased strength I prefer, in some cases at least, to fill the pipe with a piece of wood B, preferably oak, made of a size and length to fit the interior of the pipe and steamed before being inserted into the pipe, so that it may be bent with it into the desired shape. The wood filling, however, need not be used unless preferred, and, if desired, the brake-beam A may be made entirely of the hollow section of pipe. I make the socket-pieces of malleable cast-iron and preferably hollow, as shown in Fig. 5 and other figures, so as to secure minimum weight. Each of these socket-pieces has a solid portion at or near its center, with the hole or socket E passing transversely through it. One end of the socket-piece is made corrugated and of the proper size to fit into the end of the pipe A, while the other or outer end is made of any desired size and shape to conform to the various kinds of brake-shoes and brake-shoe heads that may be employed. In Figs. 5 and 6 I have shown these ends as made both rectangular and cylindrical; but it is obvious that other forms may be adopted, if desired. It is also obvious that the inner ends of the socket-pieces may be left plain—that is, without corrugations, if desired—and may be attached to the ends of the pipe simply by slipping them in or by shrinking, or rivets, or by cutting screw-threads in the pipe and on the socket-pieces, or in any other well-known way; but I prefer to attach them by corrugating, as here described. The ends of the pipe being first heated to the proper degree, the corrugated ends of the socket-pieces are inserted, and the ends of the pipe then corrugated by rolling or in any other suitable way, so as to make the corrugations in the pipe fit into the corrugations in the socket-pieces, thus uniting the parts firmly together.

The strut F is provided at one end with a hole to fit the brake-beam and at the other end either with a hole or U-shaped slot to fit the truss-rod G. The brake-lever may be pivoted in a slot or mortise in the strut, as shown in the drawings, or attached to it in any other suitable way. The truss-rod is made of the proper length and with its ends bent over, as shown in the drawings, so as to pass readily through the sockets in the socket-pieces.

The several parts are put together as follows: The wood filling having been first inserted, the strut slipped over upon the pipe, and the socket-pieces attached, as above stated, the brake-beam is placed in a clamp or former or other suitable machine, by which it may be bent or sprung, as shown in the drawings. The truss-rod is then inserted in the hole or slot in the other end of the strut and its ends passed through the holes in the socket-pieces, where they are firmly secured by being upset or in any other suitable manner. The brake-beam being then taken out of the clamp, will spring back a little, thus making the whole structure very firm and rigid, the strut and truss-rod being of course made of the proper length to accomplish this purpose.

The brake-shoes are attached to the outer ends of the socket-pieces, as shown in Fig. 4, or in any other convenient and suitable manner.

The truss-rod end of the strut is provided with a hole I, to which may be attached a rod or chain to afford a support for the brake-beam, in addition to the hangers J.

Having thus described my invention, what I regard as new, and desire to secure by Letters Patent, is—

1. In a brake-beam, the combination of the pipe and the corrugated socket-pieces, substantially as described.

2. In a brake-beam, the combination of a pipe A and socket-pieces C, to which the brake-heads are attached, such socket-pieces having ends D extending into the pipe and secured therein, substantially as described.

3. In a brake-beam, the combination of socket-pieces provided with transverse holes and corrugated ends, a pipe having its ends slipped over and corrugated upon the corrugated ends of the socket-pieces, and a truss-rod having its ends passed through the holes in the socket-pieces and fastened, substantially as described.

4. In a brake-beam, the combination of socket-pieces provided with transverse holes and corrugated ends, a pipe having its ends slipped over and corrugated upon the corrugated ends of the socket-pieces, a truss-rod having its ends passed through the holes in the socket-pieces and fastened, and a strut between the brake-beam and truss-rod, substantially as described.

5. In a brake-beam, the combination of the pipe, the socket-pieces, the truss-rod, and strut, substantially as described.

DAVID L. BARNES.

Witnesses:
J. W. DYRENFORTH,
SAMUEL E. HIBBEN.